US009714335B2

(12) United States Patent
Morooka

(10) Patent No.: US 9,714,335 B2
(45) Date of Patent: Jul. 25, 2017

(54) CURABLE RESIN COMPOSITION, OPTICAL COMPONENT, LENS, AND METHOD FOR MANUFACTURING OPTICAL COMPONENT

(71) Applicant: FUJIFILM Corporation, Tokyo (JP)

(72) Inventor: Naoyuki Morooka, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/019,064

(22) Filed: Feb. 9, 2016

(65) Prior Publication Data

US 2016/0160006 A1 Jun. 9, 2016

Related U.S. Application Data

(63) Continuation of application No. PCT/JP2014/071371, filed on Aug. 13, 2014.

(30) Foreign Application Priority Data

Aug. 13, 2013 (JP) .................................. 2013-168303
Jun. 10, 2014 (JP) .................................. 2014-119620

(51) Int. Cl.
| | |
|---|---|
| *C08F 2/46* | (2006.01) |
| *C08F 2/50* | (2006.01) |
| *C08G 61/04* | (2006.01) |
| *C08K 5/521* | (2006.01) |
| *C08F 265/06* | (2006.01) |
| *C08F 290/12* | (2006.01) |
| *G02B 1/04* | (2006.01) |
| *B29D 11/00* | (2006.01) |
| *C08K 5/523* | (2006.01) |
| *B29K 33/04* | (2006.01) |

(52) U.S. Cl.
CPC ........ *C08K 5/521* (2013.01); *B29D 11/00009* (2013.01); *B29D 11/0048* (2013.01); *B29D 11/00442* (2013.01); *C08F 265/06* (2013.01); *C08F 290/12* (2013.01); *C08K 5/523* (2013.01); *G02B 1/041* (2013.01); *B29K 2033/04* (2013.01)

(58) Field of Classification Search
CPC .... C08K 5/521; C08K 5/523; B29K 2033/04; C08F 265/06; C08F 290/12; C08L 33/08; C08L 33/10; B29D 11/0048; B29D 11/00009; G02B 1/041
USPC ........... 522/44, 33, 6, 1, 71, 189, 184; 520/1
See application file for complete search history.

(56) References Cited

U.S. PATENT DOCUMENTS

| | | | |
|---|---|---|---|
| 4,959,429 A | 9/1990 | Misura et al. | |
| 7,074,847 B2 | 7/2006 | Doi et al. | |
| 7,914,273 B2 | 3/2011 | Naito et al. | |
| 8,822,563 B2 | 9/2014 | Mochizuki et al. | |
| 8,952,079 B2 | 2/2015 | Morooka et al. | |
| 9,081,131 B2 | 7/2015 | Itoh | |
| 9,138,775 B2 | 9/2015 | Otani et al. | |
| 2004/0254282 A1* | 12/2004 | Suzuki ................... B32B 27/30 524/430 |
| 2005/0118430 A1 | 6/2005 | Doi et al. | |
| 2006/0093700 A1 | 5/2006 | Naito et al. | |
| 2013/0131212 A1 | 5/2013 | Mochizuki et al. | |
| 2013/0237630 A1* | 9/2013 | Morooka ................. G02B 1/04 522/182 |
| 2014/0077418 A1 | 3/2014 | Otani et al. | |
| 2014/0120313 A1 | 5/2014 | Uchida et al. | |
| 2014/0323652 A1 | 10/2014 | Itoh | |

FOREIGN PATENT DOCUMENTS

| | | |
|---|---|---|
| JP | 62-129337 A | 6/1987 |
| JP | 03-287641 A | 12/1991 |
| JP | 04-501130 A | 2/1992 |
| JP | 06-016754 A | 1/1994 |
| JP | 2003-001643 A | 1/2003 |
| JP | 2003-313215 A | 11/2003 |
| JP | 2005-031282 A | 2/2005 |
| JP | 2006-232626 A | 9/2006 |
| JP | 2009-035627 * | 2/2009 |
| JP | 2012-046726 A | 3/2012 |
| JP | 2012-107191 A | 6/2012 |
| JP | 2013-008825 A | 1/2013 |
| JP | 2013-041228 A | 2/2013 |
| WO | 90/05629 A1 | 5/1990 |

(Continued)

OTHER PUBLICATIONS

Tomizaki et al, JP 2009-035627 Machine Translation, Feb. 19, 2009.*
International Preliminary Report on Patentability issued from the International Bureau in counterpart International Application No. PCT/JP2014/071371, mailed on Feb. 25, 2016.
International Search Report for PCT/JP2014/071371 dated Nov. 11, 2014 [PCT/ISA/210].

(Continued)

*Primary Examiner* — Jessica E Whiteley
(74) *Attorney, Agent, or Firm* — Sughrue Mion, PLLC

(57) ABSTRACT

The invention has an object of providing a curable resin composition, an optical component, and a lens having excellent mold printability and excellent mold releasability. The invention relates to a curable resin composition including an alicyclic (meth)acrylate monomer having 2 or more (meth) acryloyl groups in a molecule; a polymer having a radically polymerizable group; a non-conjugated vinylidene group-containing compound; and a phosphoric acid ester, in which the phosphoric acid ester is contained by greater than 0.02 mass % and equal to or less than 3 mass % with respect to a mass of the curable resin composition; an optical component and a lens including the curable resin composition; and a method for manufacturing an optical component.

19 Claims, No Drawings

(56) References Cited

FOREIGN PATENT DOCUMENTS

WO      2006/046437 A1     5/2006
WO      2012/161315 A1    11/2012

OTHER PUBLICATIONS

Written Opinion for PCT/JP2014/071371 dated Nov. 11, 2014 [PCT/ISA/237].
Office Action dated Dec. 13, 2016 from the Japanese Patent Office in counterpart Japanese Application No. 2014-119620.

* cited by examiner

CURABLE RESIN COMPOSITION, OPTICAL COMPONENT, LENS, AND METHOD FOR MANUFACTURING OPTICAL COMPONENT

CROSS-REFERENCE TO RELATED APPLICATIONS

This application is a Continuation of PCT International Application No. PCT/JP2014/071371, filed on Aug. 13, 2014, which claims priority under 35 U.S.C. Section 119(a) to Japanese Patent Application No. 2013-168303 filed on Aug. 13, 2013 and Japanese Patent Application No. 2014-119620 filed on Jun. 10, 2014. Each of the above applications is hereby expressly incorporated by reference, in its entirety, into the present application.

BACKGROUND OF THE INVENTION

1. Field of the Invention

The present invention relates to a curable resin composition, an optical component, a lens, and a method for manufacturing an optical component. Specifically, the invention relates to a curable resin composition that can be suitably applied for molding a mold; an optical component and a lens using the curable resin composition; and a method for manufacturing an optical component.

2. Description of the Related Art

In the related art, a glass material is used as an optical system material of an imaging module such as a camera, a cellular phone with a video camera or a camera, and a door phone with a video telephone or a camera. The glass material is preferable since the glass material has various optical characteristics and excellent environmental resistance, but the glass material has a disadvantage in that weight reduction and miniaturization are not easy and workability or productivity is not good. In contrast, since a plastic material can be produced in a massive amount and has excellent workability, the plastic material is recently used in various optical system materials. In addition, an achievement in physical properties or production cost reduction that the material in the related art may not reach, by forming a compound lens obtained by combining a resin composition with an inorganic glass material, has been researched.

An optical component such as a lens using a plastic material is generally manufactured by inserting a curable resin composition into a mold for molding and curing the curable resin composition. Therefore, with respect to a curable resin composition used in an optical component, the obtained optical component is required to have excellent optical characteristics and, at the same time, satisfactory moldability. Therefore, in this regard, the material composition has been researched in various ways.

For example, JP2012-107191A discloses a curable resin composition containing a (meth)acrylate monomer, a non-conjugated vinylidene group-containing compound, and a thermal radical polymerization initiator. Here, JP2012-107191A discloses examples of the (meth)acrylate monomer include an alicyclic (meth)acrylate monomer, and further, a polymer having a non-conjugated vinyl group is used as an additive. In JP2012-107191A, it is considered that a cured product in which generation of variation at the time of molding is suppressed and an efficiency percentage after molding is high can be obtained by performing photo irradiation on such a curable resin composition in a certain condition and performing pressure molding and thermal polymerization.

In addition, JP2012-046726A discloses a curable resin composition containing a polymer (A) which includes a main chain including a carbon atom and a side chain having a polymerizable unsaturated bonding group and has a ring-shaped structure at the main chain or the side chain; and a compound having a polymerizable unsaturated bond group. Here, as an example of a compound having a polymerizable unsaturated group, an alicyclic compound having 2 methacryloyl groups is disclosed. In JP2012-046726A, it is considered that it is possible to provide a curable resin composition having optical characteristics, heat resistance, and high moldability by such a material composition.

SUMMARY OF THE INVENTION

However, the present inventors have researched moldability of the curable resin composition in the related art and clearly found that the curable resin composition disclosed in JP2012-107191A has excellent mold printability but, mold releasability is not good, cracks are easily generated in the cured product when a mold is separated from a cured product, and it is difficult to perform continuous molding.

Meanwhile, it is clearly found that the curable resin composition disclosed in JP2012-046726A has excellent mold releasability, but mold printability is not good, and it is difficult to perform molding precisely, by the research of the present inventors.

That is, in the curable resin composition in the related art, there is a problem in that mold printability and mold releasability are not compatible with each other, and an optical component having high quality is not continuously produced.

Therefore, in order to solve the problems in the related art, the present inventors proceeded with research for the purpose of providing the curable resin composition having excellent mold printability and excellent mold releasability.

As a result of the through research in order to solve the problems described above, the present inventors have found that it is possible to obtain a thermally curable resin composition having excellent mold printability and excellent mold releasability by using an alicyclic (meth)acrylate monomer having 2 or more (meth)acryloyl groups in a molecule, a polymer having a radically polymerizable group, a non-conjugated vinylidene group-containing compound, and a phosphoric acid ester, as a configuration material and further regulating a content of a phosphoric acid ester. Specifically, the invention has the following configurations.

[1] A curable resin composition including: an alicyclic (meth)acrylate monomer having 2 or more (meth)acryloyl groups in a molecule; a polymer having a radically polymerizable group; a non-conjugated vinylidene group-containing compound; and a phosphoric acid ester, in which the phosphoric acid ester is contained by greater than 0.02 mass % and equal to or less than 3 mass % respect to a mass of the curable resin composition.

[2] The curable resin composition according to [1], further including: a non-alicyclic aliphatic (meth)acrylate monomer having 2 or more (meth)acryloyl groups in a molecule.

[3] The curable resin composition according to [1] or [2], in which the phosphoric acid ester has an aliphatic group having 10 or more carbon atoms.

[4] The curable resin composition according to any one of [1] to [3], in which the phosphoric acid ester is expressed by General Formula (1) below;

General Formula (1)

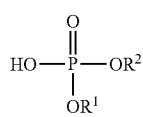

in General Formula (1), $R^1$ and $R^2$ may be identical to or different from each other, and each independently represents a hydrogen atom, or an alkyl residue, or polyoxyalkylene alkyl ether residue, or an alkenyl residue, or a polyoxyalkylene alkenyl ether residue, and at least one of $R^1$ and $R^2$ is an alkyl residue, a polyoxyalkylene alkyl ether residue, an alkenyl residue, or a polyoxyalkylene alkenyl ether residue, and has 10 or more carbon atoms.

[5] The curable resin composition according to [4], in which, in General Formula (1) above, at least one of $R^1$ and $R^2$ is an alkyl residue or a polyoxyalkylene alkenyl ether residue.

[6] The curable resin composition according to [4], in which, in General Formula (1) above, at least one of $R^1$ and $R^2$ is an alkyl residue having a branched structure.

[7] The curable resin composition according to any one of [4] to [6], in which the phosphoric acid ester at least includes a phosphoric acid ester expressed by General Formula (1) above and an aromatic phosphoric acid ester expressed by General Formula (1-2) below;

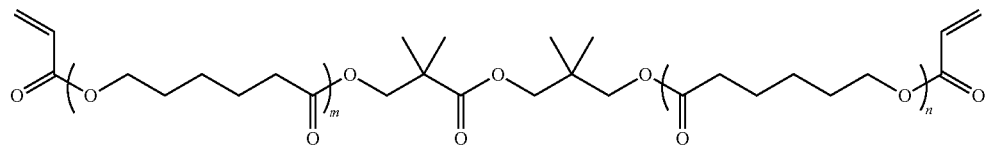

General Formula (1-2)

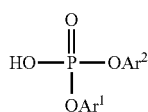

in General Formula (1-2), $Ar^1$ and $Ar^2$ may be identical to or different from each other and each independently represents a hydrogen atom or an aryl residue that may have a substituent, and at least one of $Ar^1$ and $Ar^2$ is an aryl residue that may have a substituent.

[8] The curable resin composition according to any one of [2] to [7], in which a mass mixing ratio of the alicyclic (meth)acrylate monomer and the aliphatic (meth)acrylate monomer is 90:10 to 40:60.

[9] The curable resin composition according to any one of [2] to [8], in which the aliphatic monomer is expressed by General Formula (4) below;

General Formula (4)

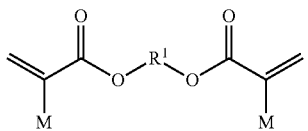

in General Formula (4), $R^1$ represents a substituted or unsubstituted alkylene group or a bivalent group obtained by combining a substituted or unsubstituted alkylene group, a carbonyl group, and an oxy group, the number of carbon atoms included in $R^1$ is 7 or greater, and M represents a hydrogen atom or a methyl group.

[10] The curable resin composition according to [9], in which, in General Formula (4), $R^1$ represents a group expressed by General Formula (5) below;

General Formula (5)

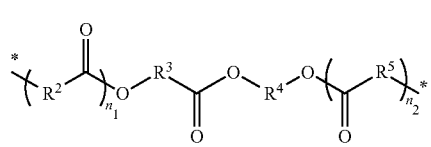

in General Formula (5), $R^2$ to $R^5$ each independently represents a substituted or unsubstituted alkylene group, and * represents a bonding position to an oxy group of General Formula (4), and $n_1$ and $n_2$ are integers of 1 or greater.

[11] The curable resin composition according to any one of [2] to [10], in which the aliphatic (meth)acrylate monomer is a compound described below;

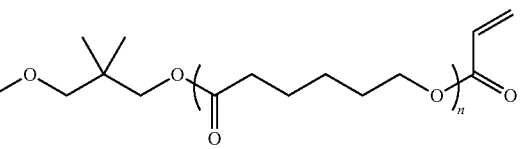

in the compound, m and n each independently represent integers of 1 to 7.

[12] The curable resin composition according to any one of [1] to [11], in which the alicyclic (meth)acrylate monomer is a compound below.

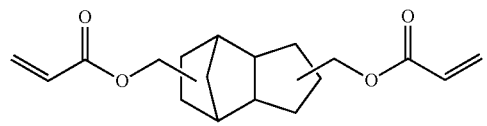

[13] The curable resin composition according to any one of [2] to [12], in which a content of the polymer having the radically polymerizable group is 10 mass % to 50 mass % with respect to the mass of the curable resin composition, a content of the non-conjugated vinylidene group-containing compound is 2 mass % to 10 mass % with respect to the mass of the curable resin composition, and a total of contents of the alicyclic (meth)acrylate monomer and the aliphatic (meth)acrylate monomer is 40 mass % to 85 mass % with respect to the mass of the curable resin composition.

[14] The curable resin composition according to any one of [2] to [13], in which a content of the polymer containing the radically polymerizable group is 10 mass % to 50 mass % with respect to the mass of the curable resin composition, a content of the non-conjugated vinylidene group-containing compound is 2 mass % to 10 mass % with respect to the mass of the curable resin composition, a total of the alicyclic (meth)acrylate monomer and an aliphatic (meth)acrylate monomer (B) is 40 mass % to 85 mass % with respect to the mass of the curable resin composition, and a mass mixing ratio of the alicyclic (meth)acrylate monomer and the aliphatic (meth)acrylate monomer is 90:10 to 40:60.

[15] The curable resin composition according to any one of [1] to [14], further including: at least one of a thermal radical polymerization initiator and a photoradical polymerization initiator.

[16] An optical component using the curable resin composition according to any one of [1] to [15].

[17] A lens using the curable resin composition according any one of [1] to [15].

[18] A method for manufacturing an optical component, including: a step of pushing a curable resin composition to a mold and expanding the curable resin composition; a step of semi-curing the curable resin composition by irradiation and thereafter thermally curing the curable resin composition at 150° C. or higher; and a step of separating the mold from a cured product of the curable resin composition in a temperature range of 150° C. to 250° C.

[19] The method for manufacturing an optical component according to [18], in which a chromium nitride treatment is performed on the mold.

[20] The method for manufacturing an optical component according to [18] or [19], in which the curable resin composition is the curable resin composition according to any one of [1] to [15].

According to the invention, it is possible to obtain a curable resin composition having excellent mold printability and excellent mold releasability. In addition, if the curable resin composition according to the invention is used, an optical component having excellent optical characteristics and high quality can be obtained in high manufacturing efficiency.

DESCRIPTION OF THE PREFERRED EMBODIMENTS

Hereinafter, the invention is described in detail. The description of the components provided below is performed based on representative embodiments or specific examples, but the invention is not limited thereto. In addition, numerical values indicated by using the expression "to" mean a range including the numerical values indicated before and after the expression "to" as a lower limit and an upper limit. In addition, the expression "(meth)acrylate" means "acrylate" and "methacrylate".

In addition, in the indication of a group (atomic group) in this specification, the indication not including substitution or unsubstitution includes a group having a substituent and also a group not having a substituent. For example, an "alkyl group" refers to not only an alkyl group not having a substituent (unsubstituted alkyl group) but also an alkyl group having a substituent (substituted alkyl group).

<Curable Resin Composition>

The curable resin composition according to the invention is a curable resin composition including an alicyclic (meth)acrylate monomer having 2 or more (meth)acryloyl groups in a molecule, a polymer having a radically polymerizable group, a non-conjugated vinylidene group-containing compound, and a phosphoric acid ester, and the curable resin composition includes greater than 0.02 mass % and equal to or less than 3 mass % of the phosphoric acid ester.

Further, the curable resin composition according to the invention preferably includes a non-alicyclic aliphatic (meth)acrylate monomer having 2 or more (meth)acryloyl groups in a molecule. Hereinafter, respective materials included in the curable resin composition are described.

[Phosphoric Acid Ester]

The curable resin composition according to the invention includes a phosphoric acid ester. The phosphoric acid ester used in the invention may be any one of a phosphoric acid monoester, a phosphoric acid diester, and a phosphoric acid triester, but a phosphoric acid monoester or a phosphoric acid diester is preferable.

In addition, the phosphoric acid ester preferably has an aliphatic group having 10 or more carbon atoms. Here, the aliphatic group is an organic group not having an aromatic ring and may be any one of a straight chain shape, a branched shape, and a cyclic shape. In addition, the aliphatic group may be configured with a carbon atom and a hydrogen atom or may include a hetero atom such as an oxygen atom. The number of carbon atoms included in the aliphatic group in the phosphoric acid ester is preferably 10 to 40, more preferably 12 to 35, and still more preferably 18 to 30.

The curable resin composition according to the invention can exhibit excellent mold releasability and excellent mold printability by containing such a phosphoric acid ester.

The phosphoric acid ester used in the invention is preferably a phosphoric acid ester expressed by General Formula (1) below.

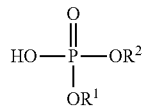

General Formula (1)

In General Formula (1), $R^1$ and $R^2$ may be identical to or different from each other, and each independently represents a hydrogen atom, an alkyl residue, a polyoxyalkylene alkyl ether residue, an alkenyl residue, or a polyoxyalkylene alkenyl ether residue. At least one of $R^1$ and $R^2$ is an alkyl residue, a polyoxyalkylene alkyl ether residue, an alkenyl residue, or a polyoxyalkylene alkenyl ether residue, and the number of carbon atoms of these groups is 10 or more. Among these, at least one of $R^1$ and $R^2$ is preferably an alkyl residue or a polyoxyalkylene alkenyl ether residue.

Specific examples of the alkyl residue include ethyl, propyl, isopropyl, butyl, isobutyl, sec-butyl, tert-butyl, hexyl, octyl, 2-ethylhexyl, decyl, dodecyl, tetradecyl, hexadecyl, octadecyl, lauryl, stearyl, tetracosyl, and isotridecyl. Among these, alkyl residues having 10 or more carbon atoms such as dodecyl, tetradecyl, hexadecyl, octadecyl, lauryl, stearyl, tetracosyl, and isotridecyl are preferable.

Examples of the polyoxyalkylene alkyl ether residue include polyoxyethylene lauryl ether, polyoxyethylene stearyl ether, and polyoxyethylene cetyl ether.

Examples of the alkenyl residue include trans-9-octadecenol, oleyl, and trans-2-decene.

Examples of the polyoxyalkylene alkenyl ether residue include polyoxyethylene oleyl ether.

Among these, in General Formula (1), $R^1$ and $R^2$ each are preferably an alkyl residue having 10 or more carbon atoms in a branched structure. Specific examples of the alkyl residue include an isotridecyl residue.

Hereinafter, preferable specific examples of the phosphoric acid ester expressed by General Formula (1) are provided. In addition, the phosphoric acid ester used in the invention is not limited to the compounds provided below.

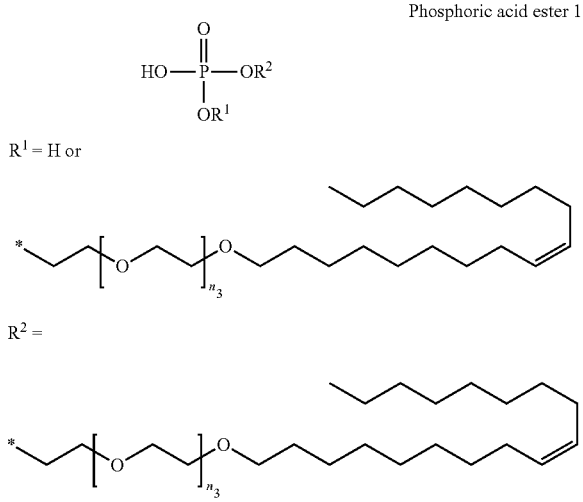

Phosphoric acid ester 1

$R^1$ = H or $R^2$ =

In the compound, $n_3$ represents an integer of 1 to 10.

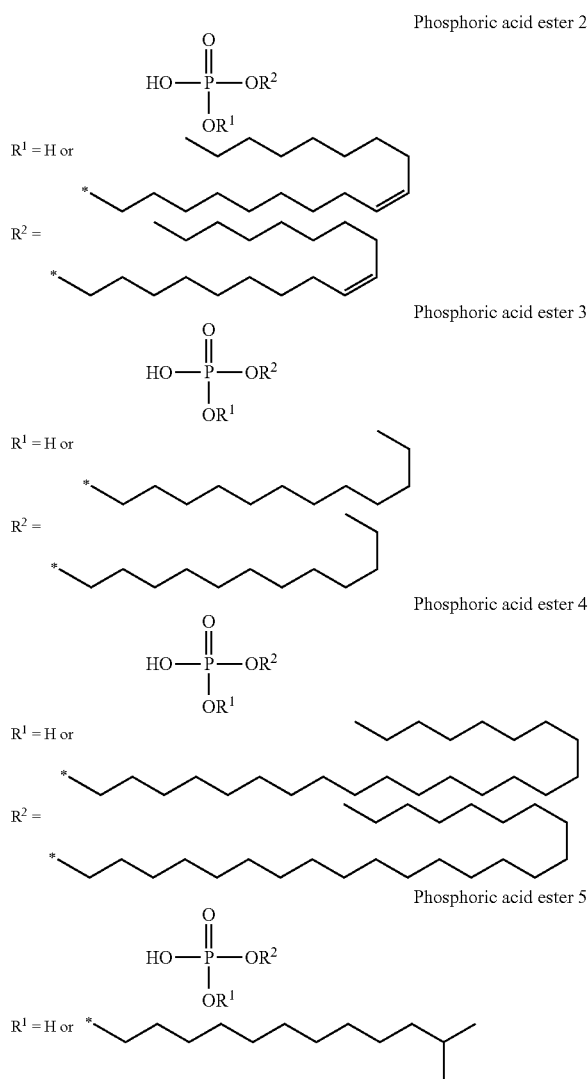

Phosphoric acid ester 2

Phosphoric acid ester 3

Phosphoric acid ester 4

Phosphoric acid ester 5

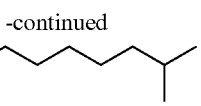

A method of obtaining these phosphoric acid esters expressed by General Formula (1) is not particularly limited, and the phosphoric acid ester may be commercially obtained or may be manufactured by synthesization.

When the phosphoric acid ester is commercially obtained, for example, CRODAS O3A-LQ (manufactured by Croda Japan KK., Phosphoric acid ester 1), oleyl phosphate (manufactured by Tokyo Chemical Industry Co., Ltd., Phosphoric acid ester 2), a dodecylphosphoric acid (manufactured by Wako Pure Chemical Industries, Ltd., Phosphoric acid ester 3), JP-524R (manufactured by Johoku Chemical Co., Ltd., tetracosyl acid phosphate, Phosphoric acid ester 4), and JP-513 (manufactured by Johoku Chemical Co., Ltd., isotridecyl acid phosphate, Phosphoric acid ester 5), or the like can be preferably used.

The content of the curable resin composition of a phosphoric acid ester is greater than 0.02 mass % and equal to or less than 3 mass % with respect to a mass of the curable resin composition, preferably 0.03 mass % to 3 mass %, more preferably 0.05 mass % to 3 mass %, still more preferably 0.1 mass % to 2.0 mass %, further still more preferably 0.1 mass % to 1.5 mass %, and particularly preferably 0.1 mass % to 1.0 mass %. If the content of the phosphoric acid ester is in the range described above, a thermally curable resin composition in which both mold printability and mold releasability are excellent can be obtained.

The phosphoric acid ester included in the curable resin composition according to the invention may further include an aromatic phosphoric acid ester expressed by General Formula (1-2).

General Formula (1-2)

In General Formula (1-2), $Ar^1$ and $Ar^2$ may be identical to or different from each other, and each independently represents a hydrogen atom or an aryl residue that may have a substituent. At least one of $Ar^1$ and $Ar^2$ is an aryl residue that may have a substituent.

Specific examples of the aryl residue expressed by $Ar^1$ and $Ar^2$ include a phenyl residue, a cresyl residue, and a xylenyl residue, and, among these, a phenyl residue is preferable.

Hereinafter, preferably specific examples of the phosphoric acid ester expressed by General Formula (1-2) are provided below.

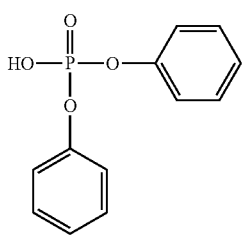

Aromatic phosphoric acid ester 1

A method of obtaining these aromatic phosphoric acid esters expressed by General Formula (1-2) is not particularly limited, and the aromatic phosphoric acid ester may be commercially obtained or may be manufactured by synthesization.

When the aromatic phosphoric acid ester is commercially obtained, for example, diphenyl phosphate (manufactured by Tokyo Chemical Industry Co., Ltd., Aromatic phosphoric acid ester 1) can be preferably used.

The content of the aromatic phosphoric acid ester in the curable resin composition is 10 mass % to 120 mass % with respect to the phosphoric acid ester expressed by General Formula (1), preferably 20 mass % to 100 mass %, more preferably 20 mass % to 80 mass %, and still more preferably 30 mass % to 80 mass %. In addition, the content of the aromatic phosphoric acid ester is preferably 0.002 mass % to 3 mass %, more preferably 0.004 mass % to 2 mass %, still more preferably 0.04 mass % to 1 mass %, and particularly preferably 0.006 mass % to 0.5 mass % with respect to the mass of the curable resin composition. If the content of the aromatic phosphoric acid ester is in the range described above, a curable resin composition in which both mold printability and mold releasability are excellent, and appearance after curing is good (impurity is small) can be obtained.

[Alicyclic (Meth)Acrylate Monomer]

The curable resin composition according to the invention includes an alicyclic (meth)acrylate monomer having 2 or more (meth)acryloyl groups in a molecule. The alicyclic (meth)acrylate monomer is obtained by bonding the 2 or more (meth)acryloyl groups to an aliphatic ring directly or via a bivalent linking group. The number of (meth)acryloyl groups bonded to an aliphatic ring is preferably 2 to 6, more preferably 2 to 4, and still more preferably 2.

The alicyclic (meth)acrylate monomer having 2 or more (meth)acryloyl groups in a molecule is preferably an alicyclic (meth)acrylate monomer expressed by General Formula (2).

General Formula (2)

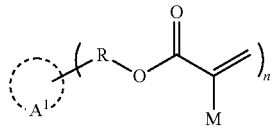

In General Formula (2), $A^1$ represents a substituted or unsubstituted aliphatic ring, R represents a single bond or a substituted or unsubstituted alkylene group, M represents a hydrogen atom or a methyl group, and n represents an integer of 2 or greater.

$A^1$ represents a substituted or unsubstituted aliphatic ring. The aliphatic ring may have a single ring structure or a polycyclic structure in which 2 or more aliphatic rings are linked or fused, and a bridged ring hydrocarbon may be included. In addition, the aliphatic ring may be configured only with a carbon atom and a hydrogen atom, or may include a hetero atom in addition to a carbon atom and a hydrogen atom. In addition, the number of carbon atoms in the aliphatic ring is not particularly limited, but the number of carbon atoms is preferably 6 to 20, more preferably 7 to 15, and still more preferably 7 to 10. Specifically, as the aliphatic ring, tricyclodecane (Aliphatic ring 1), adamantane (Aliphatic ring 2), norbornane (Aliphatic ring 3), cyclohexane (Aliphatic ring 4), and norbornene (Aliphatic ring 5) are preferable, tricyclodecane, adamantane, and norbornane are more preferable, and tricyclodecane is still more preferable. The substituted or unsubstituted aliphatic rings represented by $A^1$ may be identical to or different from each other. Here, structures of aliphatic rings 1 to 5 are provided below.

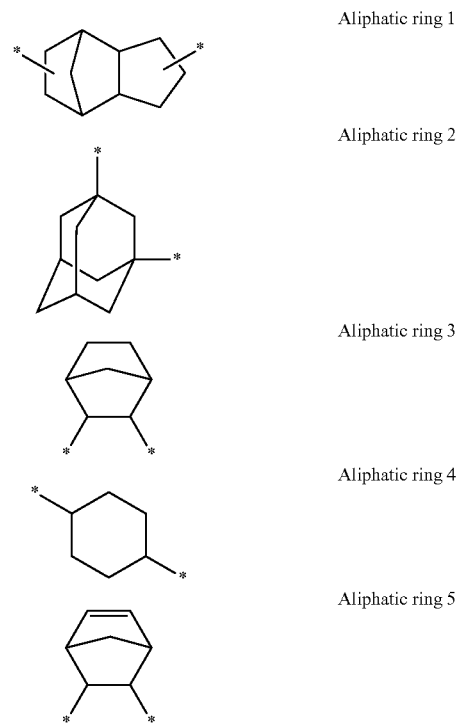

* in the compounds above represents a bonding position of R of General Formula (2).

R represents a single bond or a substituted or unsubstituted alkylene group. If R is a substituted or unsubstituted alkylene group, the carbon atoms of the alkylene group is preferably 1 to 10, more preferably 1 to 5, and still more preferably 1 to 3. The substituted or unsubstituted alkylene group represented by R may be identical to or different from each other.

M represents a hydrogen atom or a methyl group. Among these, M is preferably a hydrogen atom. M's may be identical to or different from each other.

n represents an integer of 2 or greater, and is preferably 2 to 6, more preferably 2 to 4, and still more preferably 2.

Hereinafter, preferable specific examples of the alicyclic (meth)acrylate monomer expressed by General Formula (2)

are provided. In addition, the alicyclic (meth)acrylate monomer having 2 or more (meth)acryloyl groups in a molecule used in the invention is not limited to the following compounds.

Monomer 1

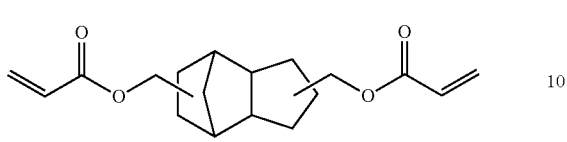

A method of obtaining the alicyclic (meth)acrylate monomer expressed by General Formula (2) is not particularly limited, and the alicyclic (meth)acrylate monomer may be commercially obtained or may be manufactured by synthesization.

When the alicyclic (meth)acrylate monomer is commercially obtained, for example, A-DCP (manufactured by Shin-Nakamura Chemical Co., Ltd., Monomer 1) can be preferably used.

[Polymer Having Radically Polymerizable Group]

The curable resin composition according to the invention includes a polymer having a radically polymerizable group. The polymer having the radically polymerizable group has a function of increasing mold printability of the curable resin composition.

Examples of the radically polymerizable group of the polymer having the radically polymerizable group include an acrylate group, a (meth)acrylate group, a vinyl group, a styryl group, and an allyl group. With respect to the polymer used in the invention, a repeating unit having the radically polymerizable group is preferably 5 mass % to 100 mass %, more preferably 10 mass % to 90 mass %, and still more preferably 20 mass % to 80 mass %.

The polymer having the radically polymerizable group may be a homopolymer or a copolymer. If the polymer is a copolymer, at least one of copolymerization components may have a radically polymerizable group.

A molecular weight of the polymer having a radically polymerizable group is preferably 1,000 to 10,000,000, more preferably 5,000 to 300,000, and particularly preferably 10,000 to 200,000.

The glass transition temperature (hereinafter, also referred to as "Tg") of the polymer having the radically polymerizable group is preferably 50° C. to 400° C., more preferably 70° C. to 350° C., and particularly preferably 100° C. to 300° C.

Hereinafter, preferable examples of the repeating unit in the polymer having the radically polymerizable group are provided below. In addition, the polymer having the radically polymerizable group used in the invention is not limited to a polymer having the following repeating units.

Repeating unit 1

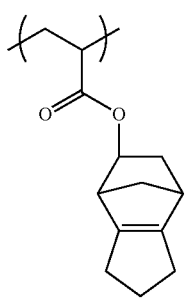

Repeating unit 2

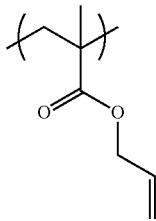

[Non-Conjugated Vinylidene Group-Containing Compound]

The curable resin composition according to the invention includes a non-conjugated vinylidene group-containing compound. According to the invention, the non-conjugated vinylidene group-containing compound can adjust a curing speed when the curable resin composition is cured, and the thickness of the cured product can be caused to be even. Accordingly, it is possible to increase the heat resistance of a cured product and a yield ratio.

The non-conjugated vinylidene group-containing compound that can be used in the invention is preferably the non-conjugated vinylidene group-containing compound expressed by General Formula (3) below.

General Formula (3)

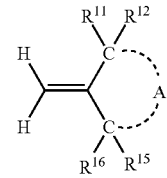

Here, in General Formula (3), $R^{11}$, $R^{12}$, $R^{15}$, and $R^{16}$ each independently represents a substituent, and A represents an atomic group that is required for forming a cyclic structure.

In General Formula (3), the substituents represented by $R^{11}$, $R^{12}$, $R^{15}$, and $R^{16}$ are not particularly limited, but examples thereof include a hydrogen atom, a halogen atom, a halogenated alkyl group, an alkyl group, an alkenyl group, an acyl group, a hydroxyl group, a hydroxyalkyl group, an aromatic ring group, a hetero aromatic ring group, and an alicyclic group. Among these, each of $R^{11}$, $R^{12}$, $R^{15}$, and $R^{16}$ is independently and preferably a substituent formed only with a hydrogen atom, an oxygen atom, and a carbon atom and more preferably a substituent formed only with a hydrogen atom and a carbon atom. Specifically, each of $R^{11}$, $R^{12}$, $R^{15}$, and $R^{16}$ is preferably a hydrogen atom, an alkyl group, and an alkenyl group, and more preferably a hydrogen atom, an alkyl group having 1 to 5 carbon atoms, and an alkenyl group having 2 to 5 carbon atoms.

In addition, $R^{11}$ and $R^{15}$ are respectively bonded to $R^{12}$ or $R^{16}$ to form rings, and the rings may further have substituents.

Among a set of $R^{11}$ and $R^{12}$ or a set of $R^{15}$ and $R^{16}$, at least one of the 2 substituents in any one set is preferably a hydrogen atom, and both of the 2 substituents in any one set are more preferably hydrogen atoms.

$R^{11}$ and $R^{12}$ each independently represent a hydrogen atom or a hydrocarbon group having 1 to 5 carbon atoms and it is preferable that a hydrocarbon group having 1 to 5 carbon atoms does not form a ring. Among $R^{11}$ and $R^{12}$, only one represents a hydrogen atom or a hydrocarbon group having 1 to 5 carbon atoms and it is preferable that a hydrocarbon group having 1 to 5 carbon atoms does not form a ring.

In General Formula (3), A represents an atomic group which is required for forming a cyclic structure, and the cyclic structure thereof is not particularly limited, and may be a well-known cyclic structure. Examples of the cyclic structure include an alicyclic ring (nonaromatic hydrocarbon ring), an aromatic ring, a heterocyclic ring, and a lactone ring including —CO—.

Among these, A is preferably an atomic group necessary for forming an alicyclic ring having 4 to 10 carbon atoms including a carbon atom linked to A of General Formula (3) and a carbon atom that configures a non-conjugated vinylidene group, and particularly preferably an atomic group required for forming an alicyclic ring having 5 to 9 carbon atoms including a carbon atom linked to A of General Formula (3) and a carbon atom that configures the non-conjugated vinylidene group.

When A of General Formula (3) forms an alicyclic ring, the alicyclic ring may have a new substituent. The substituent included in the alicyclic ring is preferably an alkyl group having 1 to 5 carbon atoms and preferably a methyl group, an ethyl group, an n-propyl group, or an isopropyl group.

A may be an unsaturated alicyclic ring or a saturated alicyclic ring, but it is preferable that at least one unsaturated bond is included in the entire non-conjugated vinylidene group-containing compound expressed by General Formula (3). In addition, A may further form a substituent represented by $R^{11}$, $R^{12}$, $R^{15}$, and $R^{16}$ and also a condensed ring.

According to the invention, in General Formula (3), $R^{11}$, $R^{12}$, $R^{15}$, and $R^{16}$ each independently represent a substituent formed only with a hydrogen atom and a carbon atom, and A is particularly preferably an alicyclic (nonaromatic hydrocarbon) structure.

According to the invention, it is preferable that the non-conjugated vinylidene group-containing compound expressed by General Formula (3) has still another alkenyl group in addition to a vinylidene group (non-conjugated vinylidene group). A position of the vinylidene group other than the non-conjugated vinylidene group having the non-conjugated vinylidene group-containing compound expressed by General Formula (3) is not particularly limited. Among these, in the non-conjugated vinylidene group-containing compound expressed by General Formula (3), the vinylidene group other than the non-conjugated vinylidene group is preferably positioned in a ring formed by $R^{11}$, $R^{12}$, $R^{15}$, and $R^{16}$. That is, the ring formed by $R^{11}$, $R^{12}$, $R^{15}$, and $R^{16}$ particularly preferably includes at least one unsaturated hydrocarbon ring, and more particularly preferably includes an unsaturated hydrocarbon ring having only one double bond.

Hereinafter, specific examples of the non-conjugated vinylidene group-containing compound expressed by General Formula (3) which is preferably used in the invention are provided, but the invention is not limited thereto.

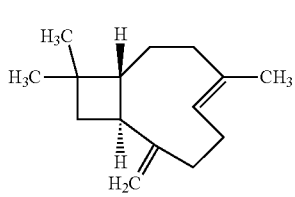

(B-1)

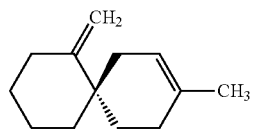

(B-2)

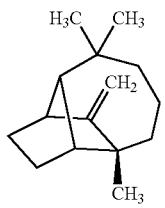

(B-3)

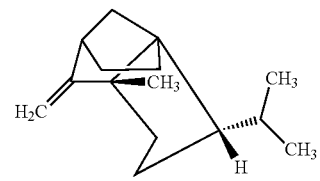

(B-4)

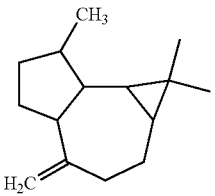

(B-5)

According to the invention, the molecular weight of the non-conjugated vinylidene group-containing compound expressed by General Formula (3) is preferably 100 to 400, more preferably 120 to 350, and particularly preferably 130 to 300.

A method of obtaining the non-conjugated vinylidene group-containing compound expressed by General Formula (3) is not particularly limited, and the non-conjugated vinylidene group-containing compound may be commercially obtained or may be manufactured by synthesization.

When the non-conjugated vinylidene group-containing compound is commercially obtained, for example, β-caryophyllene (manufactured by Tokyo Chemical Industry Co., Ltd.) of a compound (B-1) can be preferably used.

If the non-conjugated vinylidene group-containing compound is manufactured by synthesization, the method for manufacturing the non-conjugated vinylidene group-containing compound expressed by General Formula (3) is not particularly limited, but can be synthesized by a well-known method. For example, among the non-conjugated vinylidene group-containing compound expressed by General Formula (3), when β-caryophyllene which is preferably used in the invention is synthesized, the synthesization can be performed in methods disclosed in J. Am. Chem. Soc. 85, 362 (1964) and Tetrahedron Lette., 24, 1885 (1983) and the like.

The content of the non-conjugated vinylidene group-containing compound of the curable resin composition is preferably 2 mass % to 10 mass %, preferably 2 mass % to 8 mass %, and still more preferably 3 mass % to 6 mass % with respect to the mass of the curable resin composition.

<Other Additives>

According to the invention, without departing from the gist of the invention, the curable resin composition may include additives such as a polymer, another monomer, a dispersant, a plasticizer, a heat stabilizer, and a mold releasing agent.

[Non-Alicyclic Aliphatic (Meth)Acrylate Monomer]

The curable resin composition further includes a non-alicyclic aliphatic (meth)acrylate monomer having 2 or more (meth)acryloyl groups in a molecule. Accordingly, it is possible to further increase mold releasability of the curable resin composition.

The non-alicyclic aliphatic (meth)acrylate monomer is obtained by bonding 2 or more (meth)acryloyl groups to an aliphatic group that does not have a cyclic structure. The aliphatic group is an organic group that does not have an aromatic ring, and may have a straight chain shape or a branched shape. In addition, the aliphatic group may be formed only with a carbon atom and a hydrogen atom, and may include a hetero atom such as an oxygen atom. The number of acryloyl groups bonded to the aliphatic group is preferably 2 to 6, more preferably 2 to 4, and still more preferably 2.

The alicyclic (meth)acrylate monomer included in 2 or more (meth)acryloyl groups in a molecule is preferably an alicyclic (meth)acrylate monomer expressed by General Formula (4) below.

General Formula (4)

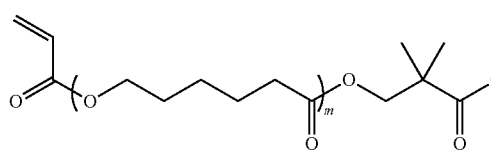

In General Formula (4), $R^1$ represents a substituted or unsubstituted alkylene group or a bivalent group obtained by combining a substituted or unsubstituted alkylene group, a carbonyl group, and an oxy group, and the number of carbon atoms of $R^1$ is 7 or greater. In addition, M represents a hydrogen atom or a methyl group.

The number of carbon atoms of $R^1$ is preferably 7 to 100, more preferably 9 to 85, and still more preferably 10 to 40.

Preferable examples of the bivalent group obtained by combining an alkylene group, a carbonyl group, and an oxy group, which is represented by $R^1$, include groups expressed by General Formula (5) below.

General Formula (5)

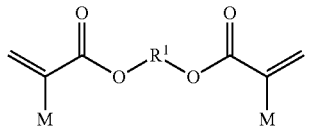

In General Formula (5), $R^2$ to $R^5$ each independently represents a substituted or unsubstituted alkylene group, and * represents a bonding position to an oxy group of General Formula (4). $n_1$ and $n_2$ each independently represent an integer of 1 or greater.

The number of carbon atoms in each of the alkylene group portions of the substituted or unsubstituted alkylene groups which are represented by $R^2$ to $R^5$ is not particularly limited, but the number of carbon atoms is preferably 2 to 20, more preferably 2 to 10, and still more preferably 4 to 6. The substituted or unsubstituted alkylene groups represented by $R^2$ to $R^5$ may be identical to or different from each other.

$n_1$ and $n_2$ are preferably 1 to 10, more preferably 1 to 8, and still more preferably 1 to 7. $n_1$ and $n_2$ may be identical to or different from each other.

Hereinafter, preferable specific examples of General Formula (4) are provided. In addition, the non-alicyclic aliphatic (meth)acrylate monomer having 2 or more (meth) acrylate groups in a molecule is not limited to compounds described below.

Monomer 2

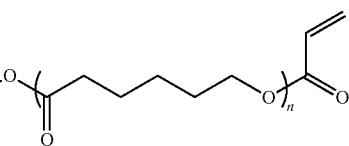

In the compound, m and n each are an integer of 1 or greater.

Monomer 3

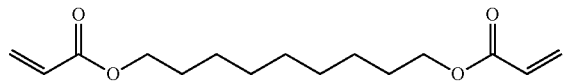

If the curable resin composition includes the non-alicyclic aliphatic (meth)acrylate monomer having 2 or more (meth) acrylate groups, the total of the alicyclic (meth)acrylate monomer and the aliphatic (meth)acrylate monomer is preferably 40 mass % to 85 mass %, more preferably 50 mass % to 80 mass %, and still more preferably 55 mass % to 75 mass % with respect to the mass of the curable resin composition.

In addition, the mass mixing ratio (w/w) of the alicyclic (meth)acrylate monomer and the aliphatic (meth)acrylate monomer is preferably 90:10 to 40:60, preferably 85:15 to 50:50, and still more preferably 80:20 to 60:40. If the total amount and the mixing ratio of the alicyclic (meth)acrylate monomer and the aliphatic (meth)acrylate monomer is caused to be in the range described above, a curable resin composition having excellent mold printability and excellent mold releasability can be obtained.

A method of obtaining the alicyclic (meth)acrylate monomer expressed by General Formula (4) is not particularly limited, and the alicyclic (meth)acrylate monomer may be commercially obtained or may be manufactured by synthesization.

When the alicyclic (meth)acrylate monomer is commercially obtained, for example, KAYARAD HX-220 (manufactured by Nippon Kayaku Co., Ltd., Monomer 2, m+n=2) or Light acrylate 1.9ND-A (manufactured by Kyoeisha Chemical Co., Ltd., Monomer 3) and the like can be preferably used.

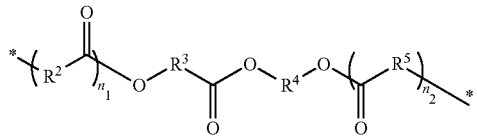

[Thermal Radical Polymerization Initiator/Photoradical Polymerization Initiator]

The curable resin composition according to the invention may further include at least one of the thermal radical polymerization initiator and the photoradical polymerization initiator. According to the invention, a cured product having high heat resistance can be easily manufactured with good moldability by including at least one of the thermal radical polymerization initiator and the photoradical polymerization initiator.

(Thermal Radical Polymerization Initiator)

Specific examples of the thermal radical polymerization initiator used in the invention include following compounds. Examples thereof include 1,1-di(t-hexylperoxy)cyclohexane, 1,1-di(t-butylperoxy)cyclohexane, 2,2-di(4,4-di-(t-butylperoxy)cyclohexyl)propane, t-hexylperoxyisopropyl monocarbonate, t-butylperoxy-3,5,5-trimethylhexanoate, t-butylperoxylaurate, dicumylperoxide, di-t-butylperoxide, t-butylperoxy-2-ethylhexanoate, t-hexylperoxy-2-ethylhexanoate, cumene hydroperoxide, t-butylhydroperoxide, and 2,3-dimethyl-2,3-diphenyl butane.

Among these, according to the invention, as the thermal radical polymerization initiator, a hydroperoxide-based thermal radical polymerization initiator having a hydroperoxide group in a molecule is preferably used, and also at least one of a hydroperoxide-based thermal radical polymerization initiator having a hydroperoxide group in a molecule and a non-hydroperoxide-based thermal radical polymerization initiator having a hydroperoxide group in a molecule is more preferably used.

In addition, according to the invention, perbutyl O manufactured by NOF Corporation (t-butylperoxy-2-ethylhexanoate) is preferably used as the non-hydroperoxide-based thermal radical polymerization initiator, and percumyl H (cumene hydroperoxide) manufactured by NOF Corporation is preferably used as the hydroperoxide-based thermal radical polymerization initiator.

The reason it is preferable that the hydroperoxide-based thermal radical polymerization initiator having the hydroperoxide group in the molecule is used as the thermal radical polymerization initiator is that the hydroperoxide-based thermal radical polymerization initiator has an effect of promoting a chain transfer in the polymerization of the non-conjugated vinylidene group-containing compound monomer, controllability of a 3-dimensional structure is enhanced, and deformability can be applied to a semi-cured product. In addition, the hydroperoxide-based thermal radical polymerization initiator generally has a high temperature in which thermal radical polymerization is started, and thus it is more preferable to use a non-hydroperoxide-based thermal radical polymerization initiator having a low thermal polymerization starting temperature together.

An addition rate of the thermal radical polymerization initiator in the curable resin composition is not particularly limited, but the number of carbon atoms is preferably 0.01 mass % to 5.0 mass %, more preferably 0.1 mass % to 4.0 mass %, and particularly preferably 0.3 mass % to 3.0 mass % with respect to the total of the polymer included in the aromatic ring-containing compound expressed by General Formula (1).

(Photoradical Polymerization Initiator)

The photoradical polymerization initiator that can be used in the invention is not particularly limited, but a well-known photoradical polymerization initiator can be used.

Specifically, following compounds can be used as the photoradical polymerization initiator. Examples thereof include bis(2,6-dimethoxybenzoyl)-2,4,4-trimethylpentylphosphine oxide, bis(2,6-dimethylbenzoyl)-2,4,4-trimethylpentylphosphine oxide, bis(2,4,6-trimethylbenzoyl)-2,4,4-trimethylpentylphosphine oxide, bis(2,6-dichlorobenzoyl)-2,4,4-trimethylpentylphosphine oxide, 1-phenyl-2-hydroxy-2-methylpropan-1-one, 1-hydroxycyclohexylphenylketone, 1-(4-isopropylphenyl)-2-hydroxy-2-methylpropan-1-one, 1,2-diphenylethanedione, methylphenylglyoxylate, 1-[4-(2-hydroxyethoxy)-phenyl]-2-hydroxy-2-methyl-1-propan-1-one, 2-hydroxy-1-{4-[4-(2-hydroxy-2-methyl-propionyl)-benzyl]phenyl}-2-methyl-propan-1-one, 2,2-dimethoxy-1,2-diphenylethan-1-one, 2-methyl-1-(4-methylthiophenyl)-2-morpholinopropan-1-one, 2-benzyl-2-dimethylamino-1-(4-morpholinophenyl)-butanone-1, 2,4,6-trimethylbenzoyl-diphenyl-phosphine oxide, and bis(2,4,6-trimethylbenzoyl)-phenylphosphine oxide. Among these, according to the invention, IRGACURE 184 manufactured by BASF AG (1-hydroxycyclohexylphenylketone), 1-[4-(2-hydroxyethoxy)-phenyl]-2-hydroxy-2-methyl-1-propan-1-one, 2-methyl-1-(4-methylthiophenyl)-2-morpholinopropan-1-one, and 2,2-dimethoxy-1,2-diphenylethan-1-one can be preferably used as the photoradical polymerization initiator.

The addition rate of the photoradical polymerization initiator in the curable resin composition is not particularly limited, but the addition rate is preferably 0.01 mass % to 5 mass %, more preferably 0.05 mass % to 1.0 mass %, and particularly preferably 0.05 mass % to 0.5 mass %.

<Method for Manufacturing Optical Component>

The method for manufacturing the optical component according to the invention includes a step of pushing a curable resin composition to a mold and expanding the resin composition, a step of thermally curing the resin composition at 150° C. or higher after semi-curing the resin composition by irradiation with light, and a step of separating the mold from the cured resin in a temperature range of 150° C. to 250° C. Hereinafter, materials and respective steps used in the manufacturing method according to the invention are described.

[Curable Resin Composition Used in the Manufacturing of Optical Component]

The curable resin composition used in the method for manufacturing the optical component according to the invention is not particularly limited, but the curable resin composition according to the invention is preferable. Since the curable resin composition according to the invention has excellent mold printability, it is possible to obtain the optical component having excellent optical characteristics and high quality by using the curable resin composition according to the invention as a material of the optical component. In addition, since the curable resin composition according to the invention has excellent mold releasability, it is possible to employ a continuous molding method. Accordingly, it is possible to enhance efficiency in manufacturing the optical component.

The curable resin composition used in the method for manufacturing the optical component according to the invention preferably includes the photoradical polymerization initiator. Accordingly, when the curable resin composition is semi-cured by the irradiation with light, a semi-cured product having a desired curing degree can be securely obtained.

[Transferring Step]

In the transferring step, the curable resin composition is injected to one of a pair of molds, and the resin composition is expanded by pushing the other mold to the resin composition.

It is preferable that the chromium nitride treatment is performed on the molds used in the transferring step.

Accordingly, in the mold releasing step performed in a subsequent step, satisfactory mold releasability can be exhibited, and thus efficiency in manufacturing the optical component can be enhanced.

Examples of the chromium nitride treatment include a method of forming a chromium nitride film on a mold surface. Examples of the method of forming the chromium nitride film on the mold surface include a CVD method and a PVD method. The CVD method is a method of forming a chromium nitride film on a substrate surface by reacting raw material gas including chrome and raw material gas including nitrogen at a high temperature. In addition, the PVD method is a method of forming a chromium nitride film on a substrate surface by using arc discharge. This arc-type vacuum vapor deposition method is a method of forming a compound by reacting ionized metal and reaction gas on the surface of a substrate. Specifically, a cathode (evaporation source) formed with, for example, chrome in the vacuum container, is disposed, arc discharge occurs through a trigger between a cathode and a wall of a vacuum container, ionization of metal by arc plasma is performed at the same time of evaporating a cathode, a negative voltage is applied to the substrate, and reaction gas, for example, nitrogen gas is input to the vacuum container by several tens of mmTorr. The chromium nitride of the mold surface according to the invention is performed by the CVD method or the PVD method.

Here, generally two molds are combined, and the molds are heated while pressurizing the contents. Therefore, if a composition in a low viscosity is injected to the molds, the composition in a low viscosity becomes a cause of leakage to molding-type clearance. Accordingly, according to the invention, it is preferable to obtain a cured product by further adding the polymer having the radically polymerizable group as described above to adjust the viscosity of the curable resin composition and performing semi-curing due to photo-irradiation and/or heating and thermal polymerization described below in one mold in view of manufacturability.

[Semi-Curing Step]

In the semi-curing step, the curable resin composition is semi-cured by the irradiation with light, so as to obtain a semi-cured product.

Here, the "semi-cured product" is obtained by polymerizing a curable resin composition, and means a product which does not completely become a solid matter but has fluidity to a certain degree. A photo- and/or thermal polymer of the curable resin composition in a state in which a complex viscosity at 25° C. in a frequency of 10 Hz is $10^5$ mPa·s to $10^8$ mPa·s is a semi-cured product. Though this value is not intended to limit the invention, it is considered that the semi-cured product is up to a product in which the upper limit value of the complex viscosity at 25° C. and in a frequency of 10 Hz is $1.0 \times 10^9$ mPa·s. Meanwhile, the "cured product" is obtained by polymerizing the curable resin composition and means a product in a state of a completely solid matter.

(Conditions of Photo-Irradiation)

Preferable conditions of the photo-irradiation in the method for manufacturing the optical component according to the invention are described below.

The photo-irradiation is preferably performed such that the complex viscosity of the semi-cured product after the photo-irradiation at 25° C. and in the frequency of 10 Hz is $10^5$ mPa·s to $10^8$ mPa·s, more preferably performed such that the complex viscosity is $10^5$ mPa·s to $10^{7.5}$ mPa·s, and particularly preferably performed such that the complex viscosity is $10^{5.5}$ mPa·s to $10^{7.5}$ mPa·s.

The light used in the photo-irradiation is preferably ultraviolet light or visible light and more preferably ultraviolet light. For example, a metal halide lamp, a low pressure mercury lamp, a high pressure mercury lamp, an ultrahigh pressure mercury lamp, a germicidal lamp, a xenon lamp, and an LED light source lamp are preferably used.

The atmosphere at the time of the photo-irradiation is preferably the air or is substituted with inert gas, and an atmosphere substituted with nitrogen until an oxygen concentration becomes 1% or less is more preferable.

(Semi-Cured Product)

The semi-cured product obtained in this step preferably has the following characteristics. That is, the complex viscosity of the semi-cured product obtained in this step at 25° C. and in the frequency of 10 Hz is preferably $10^5$ mPa·s to $10^8$ mPa·s, more preferably $10^5$ mPa·s to $10^{7.5}$ mPa·s, and still more preferably $10^{5.5}$ mPa·s to $10^{7.5}$ mPa·s.

In addition, the glass transition temperature (hereinafter, referred to as "Tg") of the semi-cured product is preferably −150° C. to 0° C., more preferably −50° C. to 0° C., and particularly preferably −20° C. to 0° C.

In addition, in the semi-cured product after photo-irradiation step, the photoradical polymerization initiator may be completely consumed and thus is not contained at all, or the photoradical polymerization initiator may be remained.

[Curing Step]

In the curing step, the semi-cured product is heated at a temperature of 150° C. or higher, so as to obtain a cured product.

The heating temperature is 150° C. or higher, and the heating temperature is preferably 160° C. to 270° C., more preferably 165° C. to 250° C., and still more preferably 170° C. to 230° C.

In this curing step, it is preferable to perform pressurization and deformation at the same time of heating. Accordingly, it is possible to precisely transfer a reversed shape on the inner side of the mold to the cured product.

The pressurization, deformation and heating may be performed at the same time, heating may be performed after pressurization and deformation, and pressurization and deformation may be performed after heating. However, among these, it is preferable to perform pressurization, deformation, and heating at the same time. In addition, it is preferable to perform pressurization, deformation, and heating at the same time and then perform heating at a higher temperature after pressurization becomes stable.

The pressure in the pressurization and deformation is preferably 1 kg/cm$^2$ to 100 kg/cm$^2$, more preferably 3 kg/cm$^2$ to 50 kg/cm$^2$, and particularly preferably 3 kg/cm$^2$ to 30 kg/cm$^2$.

The time of the thermal polymerization is preferably 30 seconds to 1,000 seconds, more preferably 30 seconds to 500 seconds, and particularly preferably 60 seconds to 300 seconds.

It is preferable that the atmosphere at the time of thermal polymerization is the air or is substituted with inert gas, and it is more preferable that the atmosphere is an atmosphere substituted with nitrogen until the oxygen concentration becomes 1% or lower.

(Mold Releasing Step)

In the mold releasing step, the mold is separated from the cured resin in the temperature range of 150° C. to 250° C., so as to obtain an optical component.

At this point, when the curable resin composition according to the invention is used as the material of the optical component, the mold can be easily separated from the optical component, and it is possible to obtain high manufacturing efficiency.

The heating temperature in this step is 150° C. to 250° C., preferably 160° C. to 250° C., more preferably 165° C. to 250° C., and still more preferably 170° C. to 230° C.

In the above, an example of the method for manufacturing the optical component according to the invention is described, but the configuration of the invention is not limited thereto, but can be appropriately changed without departing from the invention. For example, in the manufacturing example described above, the mold used in the transferring step and the semi-curing step is provided in the curing step without change, but the curing step may be performed by separating the semi-cured product from the mold and inserting the semi-cured product into another mold (molding die for thermal molding), after the semi-curing step. In this case, the chromium nitride treatment described above is preferably performed on the molding die for thermal molding. The chromium nitride treatment performed on the mold used in the transferring step described above may be referred to in the method of the chromium nitride treatment.

In addition, in the semi-curing step, the heating may be performed at the same time of performing photo-irradiation on the curable resin composition in the mold. Accordingly, it is possible to securely obtain the semi-cured product having a desired curing degree.

<Optical Component>

The optical component according to the invention can be obtained by using the curable resin composition according to the invention. The curable resin composition according to the invention includes an alicyclic (meth)acrylate monomer having 2 or more (meth)acryloyl groups in a molecule, a polymer having a radically polymerizable group, a non-conjugated vinylidene group-containing compound, and a phosphoric acid ester, and the content with respect to the mass of the curable resin composition of the phosphoric acid ester is regulated to be greater than 0.02 mass % and equal to or less than 3 mass %. Accordingly, this curable resin composition can exhibit excellent mold printability and excellent mold releasability. Therefore, the optical component used in this curable resin composition has a precise shape, excellent optical characteristics and excellent quality. In addition, it is possible to manufacture the optical component by employing a continuous molding method, so as to obtain high manufacturing efficiency.

Hereinafter, preferable characteristics of the optical component are described below.

(Refractive Index)

It is preferable that the optical component according to the invention has a high refractive index in view of using the lens among usages of optical components. Specifically, the optical component preferably has a refractive index nD in a wavelength of 589 nm is 1.45 or greater, more preferably 1.48 or greater, and particularly preferably 1.51 or greater.

(Abbe Number)

It is preferable that the optical component according to the invention has a high Abbe number, in view of reducing chromatic aberration when the optical component is used as a lens or the like among usages of optical components. The optical component according to the invention preferably has an Abbe number of 40 or greater, more preferably 45 or greater, particularly preferably 50 or greater, and more particularly preferably 52 or greater in the wavelength of 589 nm.

In this specification, the Abbe number vD is calculated by Formula (A) below by measuring respective refractive indexes nD, nF, and nC in the wavelengths of 589 nm, 486 nm, and 656 nm.

$$vD = \frac{nD - 1}{nF - nC} \qquad \text{Formula (A)}$$

(Size)

It is preferable that the optical component according to the invention has the maximum thickness of 0.1 mm to 10 mm. The maximum thickness is more preferably 0.1 mm to 5 mm and particularly preferably 0.15 mm to 3 mm. The optical component according to the invention preferably has the maximum diameter of 1 mm to 1,000 mm. The maximum diameter is more preferably 2 mm to 300 mm and particularly preferably 2.5 mm to 100 mm. The cured product in this size is particularly useful as a usage as an optical component having a high refractive index.

It is preferable that the optical component according to the invention has high refractivity, light permeability, weight reduction together, and excellent optical characteristics.

The types of the optical component are not particularly limited. Particularly, the optical component can be suitably used as an optical component using excellent optical characteristics of the curable resin composition and, particularly, an optical component (so-called passive optical component) that transmits light. Examples of the optical function device including such an optical component include various display devices (a liquid crystal display, a plasma display, or the like), various projector devices (OHP, a liquid crystal projector, or the like), an optical fiber communication device (an optical waveguide, an optical amplifier, and the like), and a photographing device such as a camera or a video.

In addition, examples of the passive optical component used in the optical function device include a lens, a prism, a prism sheet, a panel (plate-shaped molding body), a film, an optical waveguide (in a film shape, a fiber shape, or the like), an optical disk, an LED sealing material, and the like. The passive optical component may have a multi-layered structure having an arbitrary coating layer, if necessary, such as a protection layer that prevents mechanical damages of a coated surface caused by friction or abrasion, a light absorbing layer that absorbs undesired wavelengths which cause deterioration of inorganic particles and a substrate, a transmission shielding layer that suppresses or prevents the transmission of reactive low molecules such as moisture, and oxygen gas, an anti-glare layer, an anti-reflective layer, a low refractive index layer, or an arbitrary functional layer. Specific examples of the arbitrary coating layer include a gas barrier film and a transparent conductive film formed with an inorganic oxide coating layer, and a hard coat or a gas barrier film formed of an organic material coating layer. As the coating method, well-known methods such as a vacuum deposition method, a CVD method, a sputtering method, a dip coating method, and a spin coating method can be used.

(Application Example)

The lens substrate which is manufactured by using the curable resin composition according to the invention has a high Abbe number and high refractivity, and thus optical characteristics are excellent. In addition, since cracks are prevented from being generated in the step of manufacturing the cured product, durability is excellent and quality improvement is realized. Therefore, the optical component using the cured product according to the invention is preferably used particularly as a lens substrate.

In addition, in this specification, the "lens substrate" means a single member that can exhibit a function of a lens. A film or a member can be provided on the surface or in the circumference of the lens substrate in accordance with the use environment and the usage of the lens. For example, a protective film, an anti-reflection film, and a hard coat film can be formed on the surface of the lens substrate. In addition, the circumference portions of the lens substrate are fixed by being engaged with a substrate holding frame or the like. However, these films and frames are members added to the lens substrate and different from the lens substrate described in this specification.

When the lens substrate is used as the lens, the lens substrate may be singly used as a lens or may be used as a lens by adding a film or a frame. In addition, the type and the shape of the lens using the lens substrate are not particularly limited.

Since the lens substrate has a high Abbe number, the lens substrate can be preferably used as an aspherical lens for spherical aberration compensation. The aspherical lens for spherical aberration compensation is preferably used as a lens for imaging with portable or digital cameras, a photographing lens of a video camera or the like, a lens for a vehicle, or an endoscope lens.

EXAMPLES

Hereinafter, characteristics of the invention are specifically provided with reference to examples and comparative examples. Materials, usage amounts, ratios, treatment contents, treatment methods, and the like which are indicated in following examples can be appropriately changed without departing from the gist of the invention. Accordingly, the scope of the invention is not construed to be limited by the specific examples described below.

Examples 1 to 20 and Comparative Examples 1 to 4

The alicyclic (meth)acrylate monomer used in the examples and comparative examples was as below.
A-DCP: manufactured by Shin-Nakamura Chemical Co., Ltd.

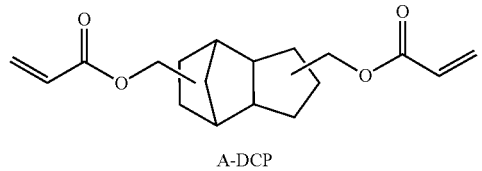

A-DCP

The aliphatic (meth)acrylate monomers used in the examples and comparative examples were as below.
KAYARAD HX-220: manufactured by Nippon Kayaku Co., Ltd.
Light Acrylate 1.9ND-A: manufactured by Kyoeisha Chemical Co., Ltd.

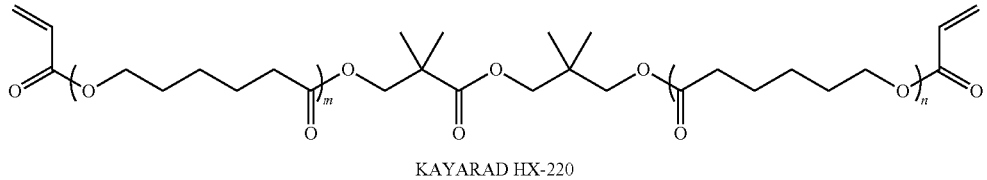

KAYARAD HX-220

In the compound above, m+n=2 was satisfied.

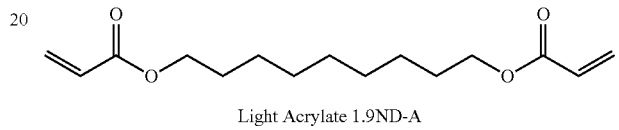

Light Acrylate 1.9ND-A

The polymers having the radically polymerizable group used in the examples and the comparative examples were a copolymer 1 of a repeating unit 1 and a repeating unit 2 provided below.

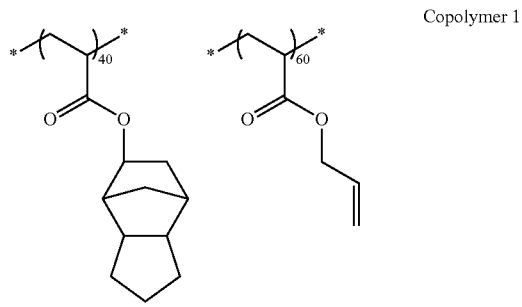

Copolymer 1

The copolymer 1 was obtained as follows. 20.0 g of tricyclo[5,2,1,0$^{2,6}$]deca-8-yl acrylate (manufactured by Hitachi Chemical Co., Ltd., FA-513AS), 30.0 g of allyl methacrylate (manufactured by Wako Pure Chemical Industries, Ltd.), and 500.0 g of MEK were added to a 1 L three-neck flask with a reflux condenser and a gas introducing cock, and nitrogen substitution was performed twice. Subsequently, 0.6 g of the initiator (manufactured by Wako Pure Chemical Industries, Ltd., V-65) was added, nitrogen substitution was further performed twice, and heating was performed at 65° C. for 6 hours under a nitrogen stream. Thereafter, a reaction liquid was poured to 2 L of methanol, and a precipitated white solid matter was collected by suction filtration. Drying at reduced pressure was performed at 70° C. for 5 hours, and a solvent was distilled (Yield ratio: 60%, number average molecular weight: 24,000, weight average molecular weight: 58,000).

The non-conjugated vinylidene group-containing compound used in the examples and comparative examples was as below.
β caryophyllene: manufactured by Tokyo Chemical Industry Co., Ltd.

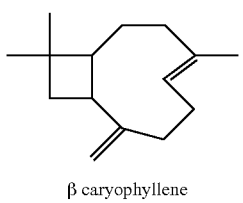

β caryophyllene

The phosphoric acid ester used in the examples and comparative examples was as below.

CRODAS O3A-LQ: manufactured by Croda Japan KK.
Oleyl phosphate: manufactured by Tokyo Chemical Industry Co., Ltd.
Dodecylphosphoric acid: manufactured by Wako Pure Chemical Industries, Ltd.
JP-524R: manufactured by Johoku Chemical Co., Ltd.
JP-513: manufactured by Johoku Chemical Co., Ltd.
Diphenyl phosphate: manufactured by Tokyo Chemical Industry Co., Ltd.

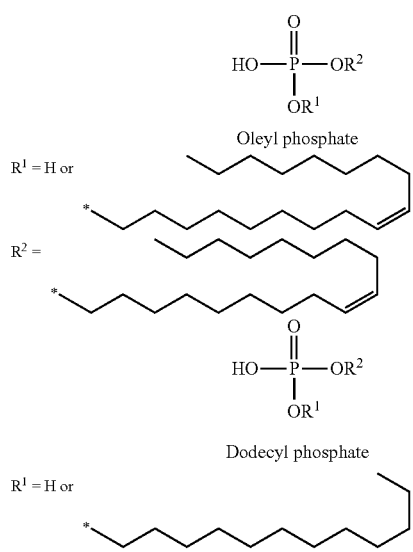

CRODAS O3A-LQ

In the compound above, $n_3=3$ was satisfied.

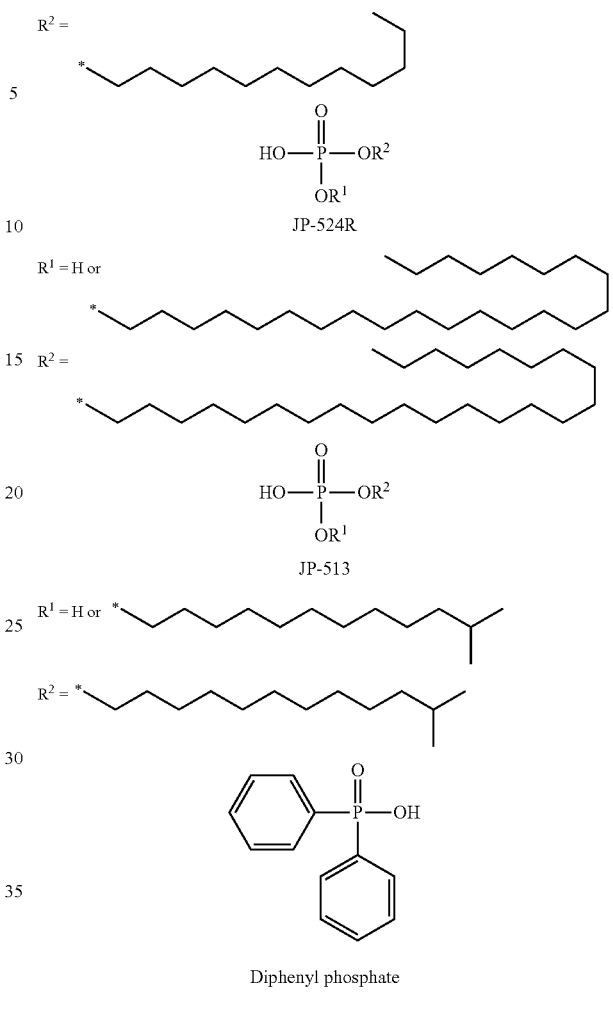

A photopolymerization initiator used in the examples and comparative examples was as below.

IRGACURE 651: manufactured by BASF AG

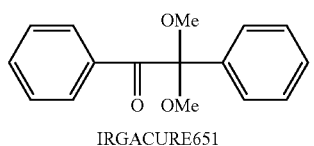 [SMILES: COC(OC)(C(=O)c1ccccc1)c1ccccc1]

IRGACURE651

The thermal polymerization initiators used in the examples and comparative examples were as below.

Perbutyl O: manufactured by NOF Corporation
Percumyl H-80: manufactured by NOF Corporation

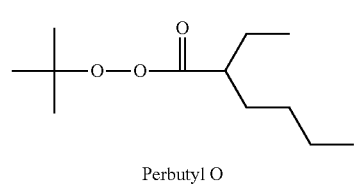

Perbutyl O

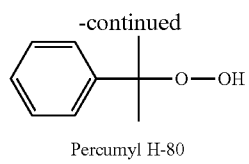

Percumyl H-80

[Manufacturing of Curable Resin Composition]

The respective components were added so as to be the compositions described in Table 1 below, and evenly stirred, so as to prepare curable resin compositions.

[Method of Manufacturing Compound Lens (Lens)]

200 mg of the curable resin composition was injected to molding molds (a surface of this mold that was in contact with the curable resin composition had an aspherical shape) of which surfaces were subjected to a Ni plating treatment or a chromium nitride treatment. A transparent glass lens (convex lens in which glass material=BK7, diameter: 33 mm, center thickness: 3 mm, curvature radius of a surface in contact with the curable resin composition=44.3 mm, curvature radius of a surface not in contact with the curable resin composition=330.9 mm) was covered with the injected curable resin composition such that the entire surface that was not in contact with the molding molds of the curable resin composition was covered, and the curable resin composition was expanded such that the diameter became 30 mm. After expansion, the upper side of the glass lens was irradiated with 300 mJ/cm² of infrared light by using Execure 3000 (manufactured by HOYA Corporation). Subsequently, a state in which the curable resin composition was interposed between the molding molds and the glass lens was maintained, and the curable resin composition was heated to 200° C. while a pressure of 2 kgf/cm² was applied to the curable resin composition, and the cured product of the curable resin composition and the molding molds were separated from each other at a speed of 0.05 mm/sec, so as to manufacture a compound lens.

Compound lenses for evaluation of surface transferring properties were manufactured by repeating the above operations 10 times respectively for the cases where the molds were Ni-plated surfaces and chromium nitride surfaces.

Compound lenses for continuous moldability evaluation were manufactured by repeating the above operations 100 times respectively for the cases where the molds were Ni-plated surfaces and chromium nitride surfaces.

<Evaluation Compound Lens>

(Surface Transferring Properties)

Appearances of the manufactured compound lenses were evaluated by using a microscope (manufactured by Keyence Corporation, VHX-1000).

A compound lens in which minute unevenness (wrinkles) was generated on the surface of the compound lens was considered as a defective product and a compound lens in which minute unevenness (wrinkles) was not generated was considered as a conforming product. 10 compound lenses were evaluated, and a ratio of conforming products was used as a yield ratio, the compound lenses were evaluated in the following criteria.

Rank 3: A yield ratio was 90% or greater.

Rank 2: A yield ratio was 50% or greater and less than 90%.

Rank 1: A yield ratio is less than 50%.

(Continuous Moldability Evaluation)

Appearances of the manufactured compound lenses were evaluated by using a microscope (manufactured by Keyence Corporation, VHX-1000).

A compound lens in which a crack was generated on the surface of the compound lens was considered as a defective product and a compound lens in which a crack was not generated was considered as a conforming product. 100 compound lenses were evaluated, and a ratio of conforming products was used as a yield ratio, the compound lenses were evaluated in the following criteria.

Rank 5: A yield ratio was 90% or greater.

Rank 4: A yield ratio was 70% or greater and less than 90%.

Rank 3: A yield ratio was 50% or greater and less than 70%.

Rank 2: A yield ratio was 20% or greater and less than 50%.

Rank 1: A yield ratio was less than 20%.

TABLE 1

| | | | Example 1 | Example 2 | Example 3 | Example 4 | Example 5 | Example 6 | Example 7 | Example 8 | Example 9 |
|---|---|---|---|---|---|---|---|---|---|---|---|
| Content (parts by mass) | Alicyclic (meth)acrylate monomer | A-DCP | 65 | 62 | 17 | 48 | 68 | 27.8 | 48 | 60 | 48 |
| | Aliphatic (meth)acrylate monomer | KAYARAD HX-220 | — | — | — | — | 23 | 9.2 | 17 | 10 | 17 |
| | | Light acrylate 1.9ND-A | — | 3 | 48 | 17 | — | — | — | — | — |
| | Radically polymerizable group-containing polymer | Copolymer 1 | 30 | 30 | 30 | 30 | 8 | 52 | 30 | 30 | 30 |
| | Non-conjugated vinylidene group-containing compound | β caryophyllene | 5 | 5 | 5 | 5 | 1 | 11 | 5 | 5 | 5 |
| | Phosphoric acid ester | CRODAFOS O3A-LQ | 0.5 | 0.5 | 0.5 | 0.5 | 0.5 | 0.5 | 0.5 | 0.5 | 0.1 |
| | | Oleyl phosphate | — | — | — | — | — | — | — | — | — |
| | | Dodecyl phosphate | — | — | — | — | — | — | — | — | — |
| | | JP-524R | — | — | — | — | — | — | — | — | — |
| | | JP-513 | — | — | — | — | — | — | — | — | — |

TABLE 1-continued

|  |  |  |  |  |  |  |  |  |  |  |  |
|---|---|---|---|---|---|---|---|---|---|---|---|
|  | Aromatic phosphoric acid ester | Diphenyl phosphate | — | — | — | — | — | — | — | — | — |
|  | Photo-polymerization initiator | IRGACURE 651 | 0.1 | 0.1 | 0.1 | 0.1 | 0.1 | 0.1 | 0.1 | 0.1 | 0.1 |
|  | Thermal polymerization initiator | Perbutyl O | 1 | 1 | 1 | 1 | 1 | 1 | 1 | 1 | 1 |
|  |  | Percumyl H-80 | 0.7 | 0.7 | 0.7 | 0.7 | 0.7 | 0.7 | 0.7 | 0.7 | 0.7 |
|  | Total |  | 102.3 | 102.3 | 102.3 | 102.3 | 102.3 | 102.3 | 102.3 | 107.3 | 101.9 |
| Alicyclic (meth)acrylate monomer/aliphatic (meth)acrylate monomer |  |  | 100/0 | 95/5 | 26/74 | 75/25 | 75/25 | 75/25 | 75/25 | 86/14 | 74/26 |
| Content (mass %) | Alicyclic (meth)acrylate monomer + aliphatic (meth)acrylate monomer |  | 63.5 | 63.5 | 63.5 | 63.5 | 89 | 36.2 | 63.5 | 65.2 | 63.8 |
|  | Phosphoric acid ester |  | 0.5 | 0.5 | 0.5 | 0.5 | 0.5 | 0.5 | 0.5 | 0.5 | 0.1 |
|  | Radically polymerizable group-containing polymer |  | 29.3 | 29.3 | 29.3 | 29.3 | 7.8 | 50.8 | 29.3 | 28.0 | 29.4 |
|  | Non-conjugated vinylidene group-containing compound |  | 4.9 | 4.9 | 4.9 | 4.9 | 1 | 10.8 | 4.9 | 4.7 | 4.9 |
| Content of aromatic phosphoric acid ester with respect to phosphoric acid ester (mass %) |  |  | 0 | 0 | 0 | 0 | 0 | 0 | 0 | 0 | 0 |
| Evaluation | Ni-plated mold | Surface transferring properties | 3 | 3 | 2 | 3 | 2 | 2 | 3 | 3 | 3 |
|  |  | Continuous moldability | 2 | 3 | 4 | 3 | 5 | 4 | 4 | 4 | 3 |
|  | Chromium nitride-treated mold | Surface transferring properties | 3 | 3 | 2 | 3 | 2 | 2 | 3 | 3 | 3 |
|  |  | Continuous moldability | 3 | 3 | 5 | 4 | 5 | 4 | 5 | 5 | 4 |

|  |  |  | Example 10 | Example 11 | Example 12 | Comparative Example 1 | Comparative Example 2 | Comparative Example 3 | Comparative Example 4 |
|---|---|---|---|---|---|---|---|---|---|
| Content (parts by mass) | Alicyclic (meth)acrylate monomer | A-DCP | 48 | 48 | 48 | 65 | 100 | 48 | 48 |
|  | Aliphatic (meth)acrylate monomer | KAYARAD HX-220 | 17 | 17 | 17 | — | — | 17 | 17 |
|  |  | Light acrylate 1.9ND-A | — | — | — | — | — | — | — |
|  | Radically polymerizable group-containing polymer | Copolymer 1 | 30 | 30 | 30 | 30 | — | 30 | 30 |
|  | Non-conjugated vinylidene group-containing compound | β caryophyllene | 5 | 5 | 5 | 5 | — | 5 | 5 |
|  | Phosphoric acid ester | CRODAFOS O3A-LQ | 2.5 | — | — | — | 0.5 | 0.02 | 3.5 |
|  |  | Oleyl phosphate | — | 0.5 | — | — | — | — | — |
|  |  | Dodecyl phosphate | — | — | 0.5 | — | — | — | — |
|  |  | JP-524R | — | — | — | — | — | — | — |
|  |  | JP-513 | — | — | — | — | — | — | — |
|  | Aromatic phosphoric acid ester | Diphenyl phosphate | — | — | — | — | — | — | — |
|  | Photo-polymerization initiator | IRGACURE 651 | 0.1 | 0.1 | 0.1 | 0.1 | 0.1 | 0.1 | 0.1 |
|  | Thermal polymerization initiator | Perbutyl O | 1 | 1 | 1 | 1 | 1 | 1 | 1 |
|  |  | Percumyl H-80 | 0.7 | 0.7 | 0.7 | 0.7 | 0.7 | 0.7 | 0.7 |
|  | Total |  | 104.3 | 102.3 | 102.3 | 101.8 | 102.3 | 101.82 | 105.3 |
| Alicyclic (meth)acrylate monomer/aliphatic (meth)acrylate monomer |  |  | 74/26 | 74/26 | 74/26 | 100/0 | 100/0 | — | — |
| Content (mass %) | Alicyclic (meth)acrylate monomer + aliphatic (meth)acrylate monomer |  | 62.3 | 63.5 | 63.5 | 63.9 | 97.8 | 63.8 | 61.7 |
|  | Phosphoric acid ester |  | 2.4 | 0.5 | 0.5 | 0.0 | 0.5 | 0.0196 | 3.3 |
|  | Radically polymerizable group-containing polymer |  | 28.8 | 29.3 | 29.3 | 29.5 | 0.0 | 29.5 | 28.5 |
|  | Non-conjugated vinylidene group-containing compound |  | 4.8 | 4.9 | 4.9 | 4.9 | 0.0 | 4.9 | 4.7 |

TABLE 1-continued

| | | | | | | | | |
|---|---|---|---|---|---|---|---|---|
| Content of aromatic phosphoric acid ester with respect to phosphoric acid ester (mass %) | | | 0 | 0 | 0 | 0 | 0 | 0 | 0 |
| Evaluation | Ni-plated mold | Surface transferring properties | 2 | 3 | 3 | 3 | 1 | 3 | 1 |
| | | Continuous moldability | 5 | 4 | 4 | 1 | 5 | 1 | 5 |
| | Chromium nitride-treated mold | Surface transferring properties | 2 | 3 | 3 | 3 | 1 | 3 | 1 |
| | | Continuous moldability | 5 | 4 | 4 | 1 | 5 | 1 | 5 |

Further, with respect to Examples 13 to 20, appearances (existence/nonexistence of impurity) of the compound lenses were evaluated as follows.

(Appearance (Impurity))

The appearances of the manufactured compound lenses were evaluated by using an optical microscope. While the glass lens sides of the compound lenses were irradiated with a light source, the surfaces of the cured products were observed with an optical microscope, so as to evaluate the following criteria. In addition, Rank 2 or higher of the appearance properties was the practically usable level.

Rank 4: Impurity was rarely seen.
Rank 3: Impurity was slightly seen.
Rank 2: Impurity was seen.
Rank 1: Impurity was considerably seen.

respective compositions were included in a proper content exhibited excellent surface transferring properties and excellent continuous moldability. Further, the thermally curable resins of Examples 13 to 20 exhibited excellent appearance, which was more satisfactory than the thermally curable resins of Examples 1 to 12.

In contrast, the curable resin composition of Comparative Example 1 to which phosphoric acid ester was not added and the curable resin composition of Comparative Example 3 in which the content of and phosphoric acid ester was 0.02 mass % or less had deteriorated continuous moldability. In addition, the curable resin composition of Comparative Example 4 in which the content of phosphoric acid ester was greater than 3 mass % had excellent continuous moldability

TABLE 2

| | | | Example 13 | Example 14 | Example 15 | Example 16 | Example 17 | Example 18 | Example 19 | Example 20 |
|---|---|---|---|---|---|---|---|---|---|---|
| Content (parts by mass) | Alicyclic (meth)acrylate monomer | A-DCP | 65 | 65 | 65 | 65 | 48 | 48 | 48 | 48 |
| | Aliphatic (meth)acrylate monomer | KAYARAD HX-220 | — | — | — | — | 17 | 17 | 17 | 17 |
| | | Light acrylate 1.9ND-A | — | — | — | — | — | — | — | — |
| | Radically polymerizable group-containing polymer | Copolymer 1 | 30 | 30 | 30 | 30 | 30 | 30 | 30 | 30 |
| | Non-conjugated vinylidene group-containing compound | β caryophyllene | 5 | 5 | 5 | 5 | 5 | 5 | 5 | 5 |
| | Phosphoric acid ester | CRODAFOS O3A-LQ | — | — | — | — | — | — | — | — |
| | | Oleyl phosphate | — | — | — | — | — | — | — | — |
| | | Dodecyl phosphate | — | — | — | — | — | — | — | — |
| | | JP-524R | 0.1 | — | 0.1 | — | — | 0.1 | — | — |
| | | JP-513 | — | 0.05 | — | 0.05 | 0.05 | — | 0.05 | 0.022 |
| | Aromatic phosphoric acid ester | Diphenyl phosphate | — | — | 0.03 | 0.015 | — | 0.03 | 0.015 | — |
| | Photopolymerization initiator | IRGACURE 651 | 0.1 | 0.1 | 0.1 | 0.1 | 0.1 | 0.1 | 0.1 | 0.1 |
| | Thermal polymerization initiator | Perbutyl O | 1 | 1 | 1 | 1 | 1 | 1 | 1 | 1 |
| | | Percumyl H-80 | 0.7 | 0.7 | 0.7 | 0.7 | 0.7 | 0.7 | 0.7 | 0.7 |
| | Total | | 101.9 | 101.9 | 101.93 | 101.865 | 101.85 | 101.93 | 101.865 | 101.822 |
| Alicyclic (meth)acrylate monomer/aliphatic (meth)acrylate monomer | | | 100/0 | 100/0 | 100/0 | 100/0 | 75/25 | 75/25 | 75/25 | 75/25 |
| Content (mass %) | Alicyclic (meth)acrylate monomer + aliphatic (meth)acrylate monomer | | 63.8 | 63.8 | 63.8 | 63.8 | 63.8 | 63.8 | 63.8 | 63.8 |
| | Phosphoric acid ester | | 0.1 | 0.05 | 0.13 | 0.065 | 0.05 | 0.13 | 0.065 | 0.022 |
| | Radically polymerizable group-containing polymer | | 29.4 | 29.4 | 29.4 | 29.5 | 29.5 | 29.4 | 29.5 | 29.5 |
| | Non-conjugated vinylidene group-containing compound | | 4.9 | 4.9 | 4.9 | 4.9 | 4.9 | 4.9 | 4.9 | 4.9 |
| Content of aromatic phosphoric acid ester with respect to phosphoric acid ester (mass %) | | | 0 | 0 | 30 | 30 | 0 | 30 | 30 | 0 |
| Evaluation | Ni-plated mold | Surface transferring properties | 3 | 3 | 3 | 3 | 3 | 3 | 3 | 3 |
| | | Continuous moldability | 4 | 4 | 4 | 4 | 5 | 5 | 5 | 3 |
| | Chromium nitride-treated mold | Surface transferring properties | 3 | 3 | 3 | 3 | 3 | 3 | 3 | 3 |
| | | Continuous moldability | 5 | 5 | 5 | 5 | 5 | 5 | 5 | 4 |
| | | Appearance properties (impurity) | 2 | 3 | 4 | 4 | 3 | 3 | 4 | 4 |

All the curable resin compositions of Examples 1 to 20 exhibited satisfactory surface transferring properties and continuous moldability. Particularly, the thermally curable resins of Examples 7 and 8 and Examples 13 to 20 in which but had deteriorated surface transferring properties. Further, the curable resin composition of Comparative Example 2 to which the radically polymerizable group-containing polymer and the non-conjugated vinylidene group-containing compound were not added also had excellent continuous moldability but had deteriorated surface transferring properties.

INDUSTRIAL APPLICABILITY

According to the invention, it is possible to obtain a curable resin composition having excellent mold printability and excellent mold releasability. Therefore, if the curable resin composition according to the invention was used, it is possible to obtain an optical component having excellent optical characteristics and high quality. Therefore, according to the invention, the optical component can be effectively used in various apparatuses, and thus industrial applicability is high.

What is claimed is:
1. A curable resin composition comprising:
   an alicyclic (meth)acrylate monomer having 2 or more (meth)acryloyl groups in a molecule;
   a polymer having a radically polymerizable group;
   a non-conjugated vinylidene group-containing compound; and
   a phosphoric acid ester,
   wherein the phosphoric acid ester is contained by greater than 0.02 mass % and equal to or less than 3 mass % with respect to a mass of the curable resin composition.
2. The curable resin composition according to claim 1, further comprising:
   a non-alicyclic aliphatic (meth)acrylate monomer having 2 or more (meth)acryloyl groups in a molecule.
3. The curable resin composition according to claim 1, wherein the phosphoric acid ester has an aliphatic group having 10 or more carbon atoms.
4. The curable resin composition according to claim 1, wherein the phosphoric acid ester is expressed by General Formula (1) below;

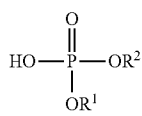

General Formula (1)

in General Formula (1), $R^1$ and $R^2$ may be identical to or different from each other, and each independently represents a hydrogen atom, or an alkyl residue, or polyoxyalkylene alkyl ether residue, or an alkenyl residue, or a polyoxyalkylene alkenyl ether residue, and at least one of $R^1$ and $R^2$ is an alkyl residue, a polyoxyalkylene alkyl ether residue, an alkenyl residue, or a polyoxyalkylene alkenyl ether residue, and has 10 or more carbon atoms.

5. The curable resin composition according to claim 4, wherein, in General Formula (1) above, at least one of $R^1$ and $R^2$ is an alkyl residue or a polyoxyalkylene alkenyl ether residue.
6. The curable resin composition according to claim 4, wherein, in General Formula (1) above, at least one of $R^1$ and $R^2$ is an alkyl residue having a branched structure.
7. The curable resin composition according to claim 4, wherein the phosphoric acid ester at least includes a phosphoric acid ester expressed by General Formula (1) above and an aromatic phosphoric acid ester expressed by General Formula (1-2) below;

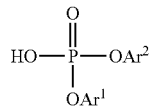

General Formula (1-2)

in General Formula (1-2), $Ar^1$ and $A^2$ may be identical to or different from each other and each independently represents a hydrogen atom or an aryl residue that may have a substituent, and at least one of $Ar^1$ and $Ar^2$ is an aryl residue that may have a substituent.

8. The curable resin composition according to claim 2, wherein a mass mixing ratio of the alicyclic (meth)acrylate monomer and the aliphatic (meth)acrylate monomer is 90:10 to 40:60.
9. The curable resin composition according to claim 2, wherein the aliphatic (meth)acrylate monomer is expressed by General Formula (4) below;

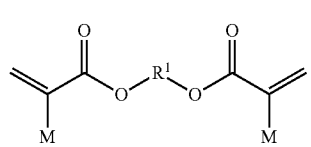

General Formula (4)

in General Formula (4), $R^1$ represents a substituted or unsubstituted alkylene group or a bivalent group obtained by combining a substituted or unsubstituted alkylene group, a carbonyl group, and an oxy group, the number of carbon atoms included in $R^1$ is 7 or greater, and M represents a hydrogen atom or a methyl group.

10. The curable resin composition according to claim 9, wherein, in General Formula (4), $R^1$ represents a group expressed by General Formula (5) below;

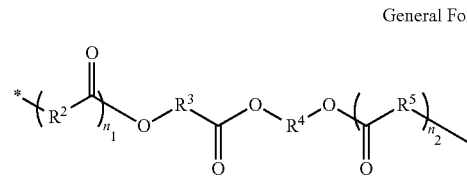

General Formula (5)

in General Formula (5), $R^2$ to $R^5$ each independently represents a substituted or unsubstituted alkylene group, and * represents a bonding position to an oxy group of General Formula (4), and $n_1$ and $n_2$ are integers of 1 or greater.

11. The curable resin composition according to claim 2, wherein the aliphatic (meth)acrylate monomer is a compound described below;

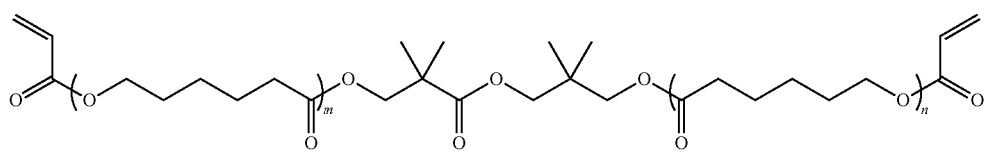

in the compound, m and n each independently represent integers of 1 to 7.

12. The curable resin composition according to claim 1, wherein the alicyclic (meth)acrylate monomer is a compound below

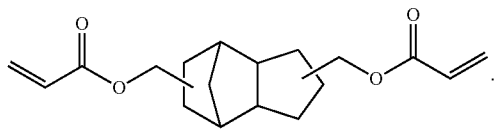

13. The curable resin composition according to claim 2, wherein a content of the polymer having the radically polymerizable group is 10 mass % to 50 mass % with respect to the mass of the curable resin composition,
a content of the non-conjugated vinylidene group-containing compound is 2 mass % to 10 mass % with respect to the mass of the curable resin composition, and
a total of contents of the alicyclic (meth)acrylate monomer and the aliphatic (meth)acrylate monomer is 40 mass % to 85 mass % with respect to the mass of the curable resin composition.

14. The curable resin composition according to claim 2, wherein a content of the polymer containing the radically polymerizable group is 10 mass % to 50 mass % with respect to the mass of the curable resin composition,
a content of the non-conjugated vinylidene group-containing compound is 2 mass % to 10 mass % with respect to the mass of the curable resin composition,
a total of the alicyclic (meth)acrylate monomer and an aliphatic (meth)acrylate monomer (B) is 40 mass % to 85 mass % with respect to the mass of the curable resin composition, and a mass mixing ratio of the alicyclic (meth)acrylate monomer and the aliphatic (meth)acrylate monomer is 90:10 to 40:60.

15. The curable resin composition according to claim 1, further comprising:
at least one of a thermal radical polymerization initiator and a photoradical polymerization initiator.

16. An optical component using the curable resin composition according to claim 1.

17. A lens using the curable resin composition according to claim 1.

18. A method for manufacturing an optical component, comprising:
pushing a curable resin composition to a mold and expanding the curable resin composition;
semi-curing the curable resin composition by irradiation and thereafter thermally curing the curable resin composition at 150° C. or higher, and
separating the mold from a cured product of the curable resin composition in a temperature range of 150° C. to 250° C.;
wherein the curable resin composition comprises
an alicyclic (meth)acrylate monomer having 2 or more (meth)acryloyl groups in a molecule;
a polymer having a radically polymerizable group;
a non-conjugated vinylidene group-containing compound; and
a phosphoric acid ester, and
wherein the phosphoric acid ester is contained by greater than 0.02 mass % and equal to or less than 3 mass % with respect to a mass of the curable resin composition.

19. The method for manufacturing an optical component according to claim 18,
wherein a chromium nitride treatment is performed on the mold.

* * * * *